(12) United States Patent
Koenig

(10) Patent No.: US 10,504,264 B1
(45) Date of Patent: Dec. 10, 2019

(54) METHOD AND SYSTEM FOR COMBINING IMAGES

(71) Applicant: Eric Koenig, Huntington, NY (US)

(72) Inventor: Eric Koenig, Huntington, NY (US)

( * ) Notice: Subject to any disclaimer, the term of this patent is extended or adjusted under 35 U.S.C. 154(b) by 0 days.

(21) Appl. No.: 16/181,355

(22) Filed: Nov. 6, 2018

(51) Int. Cl.
| | | |
|---|---|---|
| G06T 11/60 | (2006.01) | |
| G06T 11/00 | (2006.01) | |
| G06T 7/73 | (2017.01) | |
| G06T 19/20 | (2011.01) | |
| G06T 19/00 | (2011.01) | |
| G06Q 30/06 | (2012.01) | |

(52) U.S. Cl.
CPC ............... *G06T 11/60* (2013.01); *G06T 7/74* (2017.01); *G06T 11/001* (2013.01); *G06T 19/006* (2013.01); *G06T 19/20* (2013.01); *G06Q 30/0639* (2013.01); *G06T 2207/20092* (2013.01); *G06T 2207/20221* (2013.01); *G06T 2207/30196* (2013.01); *G06T 2219/2004* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 6,987,535 B1 * | 1/2006 | Matsugu | ............. | G06F 3/04845 348/239 |
| 9,406,139 B2 * | 8/2016 | Shionozaki | ........... | G06T 15/503 |
| 9,478,054 B1 * | 10/2016 | Lewis | ...................... | G06T 11/60 |
| 10,380,748 B2 * | 8/2019 | Yu | ........................ | G06F 16/5866 |
| 2003/0002730 A1 * | 1/2003 | Petrich | ...................... | G06T 7/40 382/154 |
| 2013/0063487 A1 * | 3/2013 | Spiegel | ................... | G06T 11/00 345/633 |
| 2013/0088516 A1 * | 4/2013 | Ota | ........................ | G06T 19/006 345/633 |
| 2015/0304566 A1 * | 10/2015 | Seo | ..................... | H04N 5/23222 348/222.1 |
| 2016/0054903 A1 * | 2/2016 | Jeong | ................... | H04N 5/2621 345/661 |
| 2018/0036175 A1 * | 2/2018 | Rollend | ..................... | A61F 9/08 |
| 2018/0150791 A1 * | 5/2018 | Stansell | .............. | G06Q 10/087 |
| 2018/0336732 A1 * | 11/2018 | Schuster | .............. | G06T 19/006 |
| 2018/0374273 A1 * | 12/2018 | Holzer | .................... | G06T 19/20 |

* cited by examiner

*Primary Examiner* — Andrew G Yang
(74) *Attorney, Agent, or Firm* — Georgiy L. Khayet

(57) ABSTRACT

Disclosed are methods and systems for merging of one or more objects from various images into a single image. An example method of combining images comprises obtaining a reference image and obtaining at least one further image. The reference image and the further image have a substantially common background. The further image also includes at least one object such as an individual. The method also includes analyzing the reference image to determine positions of the object for having the object correctly placed in a combined image. Next, the images can be seamlessly merged into a combined image by placing the object from the further image into the reference image according the determined positions. Thereafter, digital filters and beautification techniques can be applied to the combined image.

20 Claims, 9 Drawing Sheets

METHOD AND SYSTEM FOR COMBINING IMAGES

TECHNICAL FIELD

This disclosure generally relates to image processing. More particularly, this disclosure relates to methods and systems for combining images such that at least one object present in one image can be seamlessly placed into another image.

BACKGROUND

Most, if not all, currently existing mobile devices (such as smart phones) have integrated cameras allowing users to take digital images. It is quite common for people to take and store images using mobile devices only. It is also common for mobile devices to run software applications for editing images. The editing may include color or scale adjustments, applying effects or color filters, or other digital image transformations.

Certain existing software applications allow users to merge images together. This may include merging a background image with an image depicting an individual. For example, when one individual in a group of people is designated as the group's photographer, he or she is left out of the images. The designated photographer can be later integrated into desired images. However, the existing merging techniques have certain drawbacks. For example, they may require users to perform a variety of operations to create the composite image (including masking out one subject from the first image for placement into the second image before performing other effects (such as blending and feathering to make the image look more natural). Moreover, the existing merging techniques are time consuming, inefficient, or inconvenient.

It should be noted that the approaches described in this section are not prior art to the claims and are not admitted to be prior art by inclusion in this section.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to methods and systems for merging of multiple objects from various images into a single image. An example method of combining images comprises obtaining a reference image and obtaining at least one further image. The reference image and the further image include a substantially common background. The further image also includes at least one object such as an individual. The reference image may optionally include one or more other objects such as other individuals. The images can be taken with a camera of a mobile device or uploaded from a library of the mobile device, from a library of another mobile device, or from a library stored on a cloud-based server.

The example method may also include analyzing the reference image to determine positions of the object (e.g., the individual) from the further image for the purpose of having the object correctly placed into a combined image. The user can also transform the reference image or further image, with the transformation including zooming, panning, scrolling, cropping, performing perspective corrections, changing angle of view, applying color filters, to name a few. The example method can further automatically determine the direction of light, brightness, and colors based in the lighting conditions. The transformation can also include automatically adjusting lighting parameters of the at least one further image to match lighting parameters of the reference image. Thereafter, the images can be seamlessly merged into a combined image by placing the object (e.g., the individual) into the first reference image according to the determined positions. Thereafter, digital filters and beautification techniques can be applied to the combined image.

In further embodiments, the method steps are stored on a machine-readable medium comprising computer instructions, which when implemented by a computer perform the method steps. In yet further example embodiments, hardware systems or devices can be adapted to perform the recited method steps. Other features, examples, and embodiments are described below.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
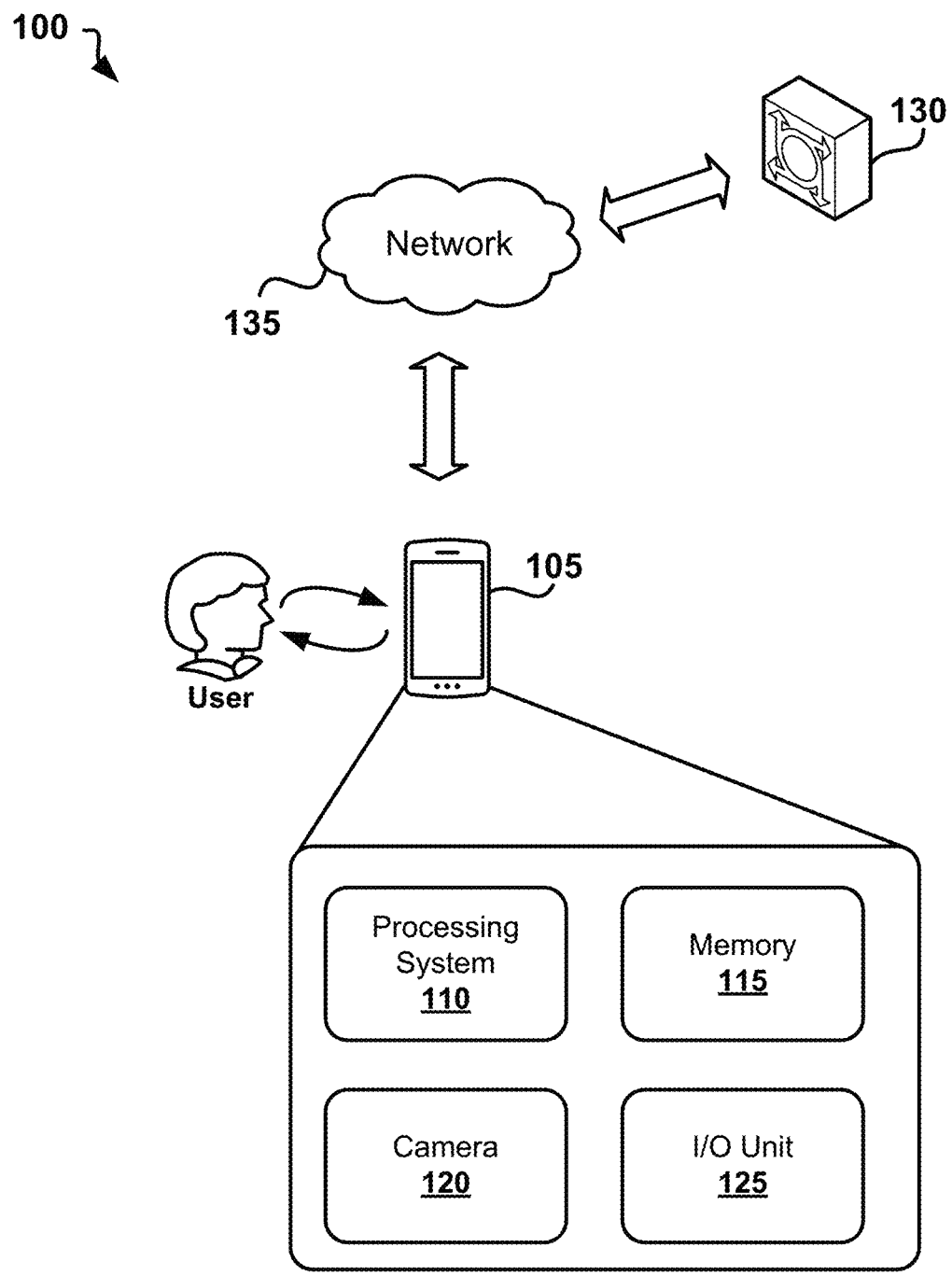
FIG. 1 illustrates an example system architecture for combining images, according to one embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to methods and systems providing instant merging of multiple objects from various images into a single image. An example system can include a mobile application installed on a mobile device. In other embodiments, the system can utilize a web service or a server. The images can be taken with a camera of a mobile device or uploaded from a library of the mobile device, from a library of another mobile device, or from a library of a server (i.e., from the "cloud"). In an example embodiment, this can be accomplished, generally, by analyzing and cross-referencing lighting information of a first image and selectively providing one or more filters to adjust the lighting conditions of a second image (or a plurality of second images) so that when the second image is taken, one or more objects (e.g., an individual) from the second image are seamlessly placed into the first image.

In some implementations, one or more algorithms can be applied to determine the distance to a given object in one image and calculate the optimal placement for this object for a second image. Furthermore, in some embodiments, the user of a mobile application is able to view, via augmented reality (AR) overlay(s), a virtual guide on the screen of the mobile device that indicates optimal placement parameters of the object into the second image so that this object can be seamlessly merged into the first image. This technique allows creating natural and photo-realistic looking images. The AR overlays may present an isolated object(s) from the second image such that the objects are overimposed onto a live view of the camera. The object(s) can be selected and/or generated automatically using various segmentation techniques. One example segmentation technique is described in Aksoy et al., *Semantic Soft Segmentation*, ACM Trans. Graph., Vol. 37, No. 4, Article 72 (August 2018), which is incorporated herein by reference in its entirety.

In some embodiments, a remote or local library can be created or updated with two-dimensional (2D) and/or three-dimensional (3D) representations of an object or series of objects, related or not, in order to make assembly and composition of the images faster in the future (i.e., once the user masks out an item from one image for placement into another image, the masked out item can be saved to the library for a quick recall and access so it can be easily integrated into additional images).

The system and method for combining images will now be presented with respect to various embodiments. These embodiments are described and illustrated in the accompanying drawings by various blocks, components, circuits, steps, operations, processes, algorithms, and the like, collectively referred to as "elements" for simplicity. Any of these elements may be implemented using electronic hardware, computer software, or a combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, including firmware and middleware. The term "software" shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more embodiments of this disclosure, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Additionally, it should be also understood that the terms "first," "second," "third," and so forth can be used herein to describe various elements. These terms are used to distinguish one element from another, but not to imply a required d of elements. For example, a first element can be termed a second element, and, similarly, a second element can be termed a first element, without departing from the scope of present teachings.

Moreover, the term "image" refers to a digital representation of a visual image in a digital image format such as JPEG (Joint Photographic Experts Group), JFIF (JPEG File Interchange Format), TIFF (Tagged Image File Format), RAW, PNG (Portable Network Graphics), GIF (Graphics Interchange Format), and the like. In some embodiments, the term image can also encompass digital drawings, renderings, or graphical images, not necessarily created by a camera. Yet, in additional embodiments, an "image" may include a video or animation.

The term "object" can refer to various graphical objects depicted in an image. Objects can include items, elements, or parts of the image. For example, an object can refer to an individual, a group of individual, an animal, a pet, or any other elements present in the image.

The term "library" refers to a logical, physical, or virtual repository, storage, memory, or database for storing data such as digital images, images, videos, 2D objects, 3D objects, and other related information.

The term "mobile device" refers to any device, system or apparatus with image displaying and processing capabilities. Some examples of the mobile device include, without limitation, a cellular phone, a mobile phone, a smart phone, a tablet computer, a laptop computer, a personal digital assistant, a music player, a multimedia player, a portable computing device, a desktop computer, a workstation, a netbook, a server, a game console, a smart television system, a digital photo or video camera, and so forth.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 illustrates an example system architecture 100 for combining images, according to one embodiment. System architecture 100 includes a mobile device 105, which can be used by one or more users. Mobile device 105 includes, without limitation, a processing system 110 that may include one or more processing devices (e.g., processors), memory 115 for storing software and images, one or more cameras 120 for capturing or generating images, and an input/output (I/O) unit 125 for displaying information via a graphical user interface (GUI) to the user and for receiving user input. In some optional embodiments, mobile device 105 may include functionality to communicate with one or more web-based resources 130 (e.g., web services, cloud computing services), interact with online providers (e.g., remote libraries or content providers), and the like. The communication between mobile device 105 and web-based resources 130 can be performed via a data network 135. Data network 135 can include any wired, wireless, or optical networks including, for example, the Internet, intranet, local area network, Personal Area Network, Wide Area Network, Virtual Private Network, cellular phone network, Bluetooth radio, Ethernet network, an IEEE 802.11-based radio frequency network, Internet Protocol (IP) communications network, or any other data communication network utilizing physical layers, link layer capability, or network layer to carry data packets, or any combinations of the above-listed data networks.

As mentioned above, mobile device 105 may be configured as any suitable type of a computing device. For example, mobile device 105 can include a smart phone, a tablet computer, a personal computer, a camera, a smart watch, or any other electronic device with sufficient memory and processing capabilities to execute techniques described herein. Mobile device 105 may be configured to run one or more software applications, such as mobile applications, which implement one or more functionalities required for implementing methods for combining images disclosed herein.

In one embodiment, mobile device 105 runs a mobile application which implements all operations of the method for combining images disclosed herein. In another embodiment, mobile device 105 includes a mobile application, which implements some operations of the method for combining images, with the remaining operations being implemented by one or more web-based resources 130. In yet other embodiments, all operations of the method for combining images are implemented by one or more web-based resources 130. Accordingly, web-based resources 130 and network 135 are optional elements in system architecture 100 of FIG. 1.

Figure 2A:
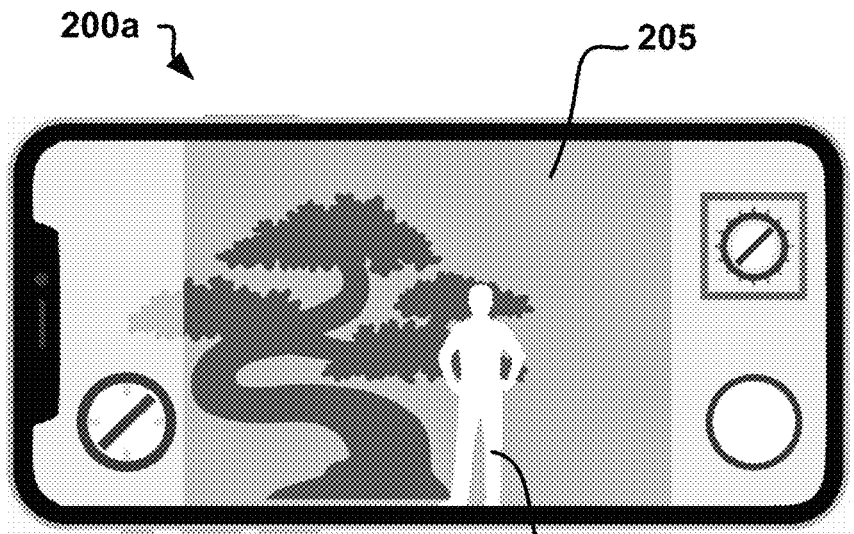
FIGS. 2A-2D show an example graphical user interface (GUI) illustrating a method for combining images, according to one example embodiment.

FIGS. 2A through 2D illustrate example GUIs which show one possible method for combining images, according to one example embodiment of the disclosure. The GUIs of FIGS. 2A-2D are displayable by mobile device 105 and can include a representation of screens associated with the mobile application installed on mobile device 105. Specifically, FIG. 2A illustrates a GUI 200*a* of the mobile application, which allows a user to take a first image with camera 120 of mobile device 105. The first image can include a background 205 and one or more objects 210. As discussed above, object 210 may include an individual or, alternatively, one or more items present in the image. Notably, rather than taking the first image, it can be selected and retrieved by the user from a local or remote library.

When the first image is taken (or retrieved from the library), the mobile application (or a web service) automatically analyzes the ambient light of the first image. Based on the analysis of the ambient light, the mobile application (or the web service) identifies the best applicable light filter for the first image from a set of available light filters. In some embodiments, the user can manually select a desired light filter to apply to the at least one further image.

Figure 2B:
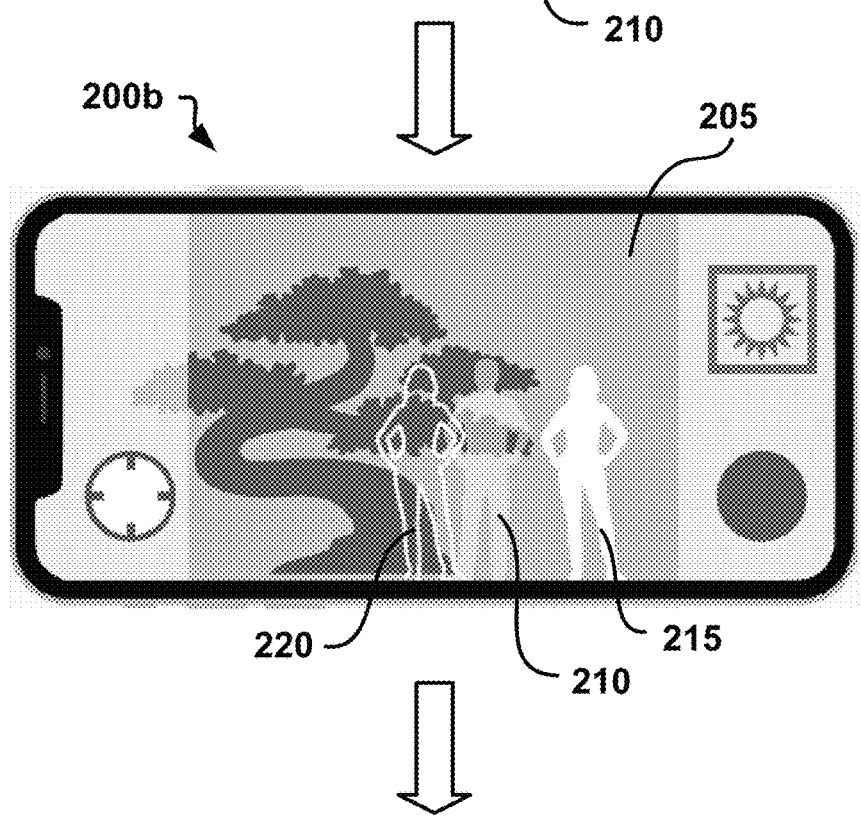

Furthermore, the user can be optionally guided by the mobile application to assist the user with an optimal placement of the object in a combined image and assist with the desired composition of the combined image. FIG. 2B illustrates a GUI 200*b* of the mobile application, which represents the guide, such as Augmented Reality (AR) guide, to provide the user with guidance on merging the images. As shown in FIG. 2B, GUI 200*b* of the mobile application includes background 205, object 210 from the first image or a representation of object 210, and one or more new objects 215. For example, new object 215 can be a further individual. It should be noted that background 205 of the second image can be the same or substantially similar to background 205 in the first image. Alternatively, in certain implementations, background 205 of the second image can differ from background 205 in the first image.

The AR guide may depict a recommended or optimal location 220 for placing new object 215 with respect to existing object 210. In certain embodiments, the mobile application (or the web service) can automatically analyze the distance of various objects present in the first image and identify the most optimal AR guide for the user to follow from a set of available AR guides.

Figures 2C, 2D:
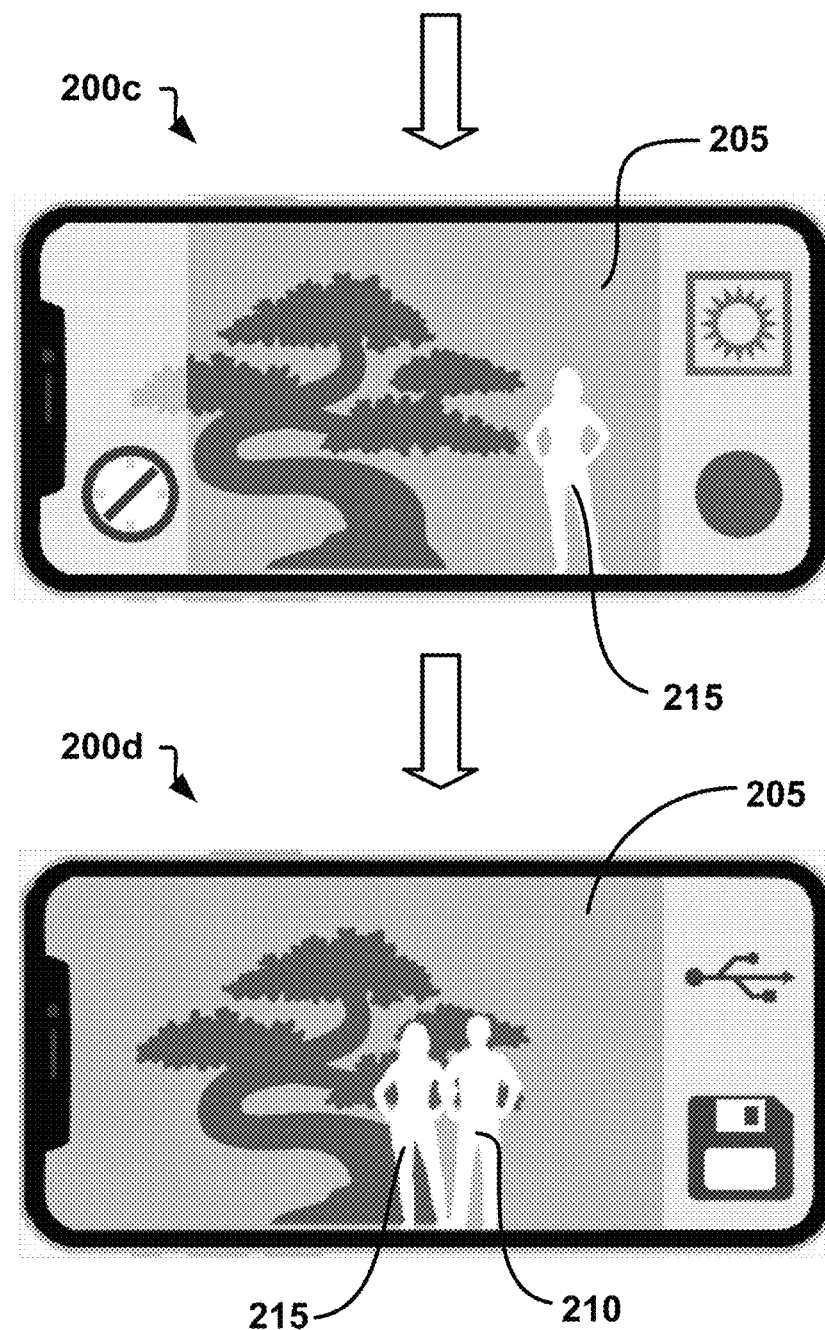

In the next step, the user obtains (e.g., captures by camera 120 or retrieves from a local or remote library) a second image with mobile device 105. In some implementations, the second image can be captured with assistance of the AR guide. FIG. 2C illustrates a GUI 200*c* of the mobile application, which shows an example of the second image. As shown in the figure, the second image may include background 205 and object 215, and optionally other objects.

GUI 200*c* can further allow the user to manually select an element or object depicted in the second image for merging with the first image. For example, the user can manually select object 215 for merging. In other embodiments, however, the mobile application (or the web service) can automatically select object 215 for merging based on one or more predetermined rules.

Finally, the mobile application (or the web service) can automatically merge the selected object (e.g., object 215) from the second image into the first image to seamlessly create a combined image. FIG. 2D illustrates a GUI 200*d* of the mobile application, which shows the combined image. The combined image includes the same or substantially the same background 205, object 210 from the first image, and object 215 from the second image.

Figure 3:
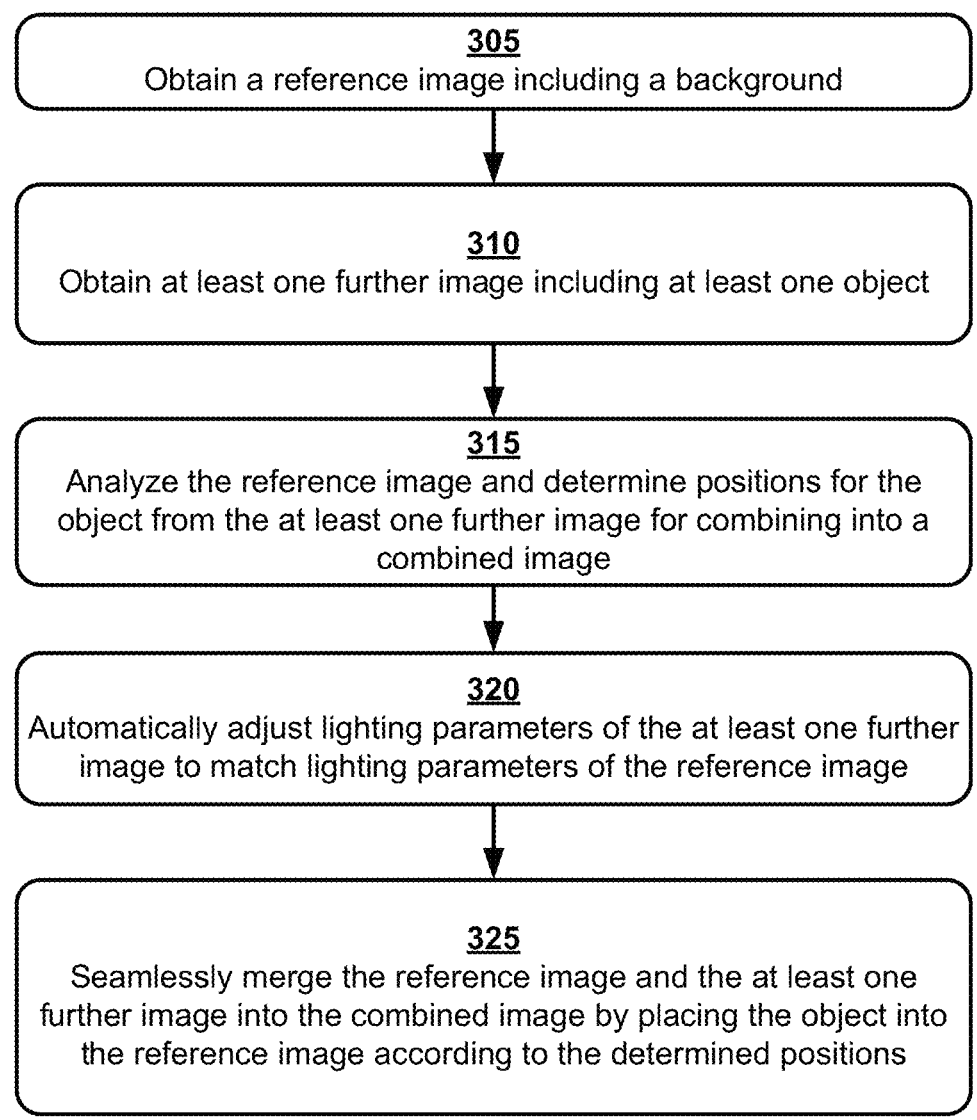
FIG. 3 is a process flow diagram showing a method for combining images according to an example embodiment.

FIG. 3 is a process flow diagram 300 showing a method for combining images according to an example embodiment. Method 300 may be performed by processing logic that comprises hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic refers to mobile device 105, web-based resource 130, or a combination of both. Below recited operations of method 300 may be implemented in an order different than described and shown in the figure. Moreover, method 300 may have additional operations not shown herein, but which can be evident to those skilled in the art from the present disclosure. Method 300 may also have fewer operations than outlined below and shown in FIG. 3.

Method 300 commences at operation 305 with mobile device 105 obtaining a reference image. The reference image can include a background and, optionally, one or more objects (e.g., individuals, pets, tangible things, etc.). In one implementation, the reference image is obtained by generating the reference image in real time using camera 120 of mobile device 105. In another implementation, the reference image can be selected from a library of mobile device 105, another mobile device, or web-based resource 130.

At operation 310, mobile device 105 obtains at least one further image including at least one object (e.g., one or more individuals, pets, animals, tangible objects, and so forth). The further image can be captured by camera 120 in real time. Notably, the reference image and the further image may (not necessarily) have a substantially common background. In some embodiments, the further image can be retrieved from the library of mobile device 105, another mobile device, or web-based resource 130.

According to some embodiments, method 300 may further include the operation of selecting of the at least one object in the further image. The selection can be performed manually by obtaining user input or automatically based on one or more predetermined rules. Moreover, in some embodiments, the further image or the reference image can be modified based on the input of a user provided via mobile device 105. The modification can include scaling, rotating, cropping, or repositioning of the further image or reference image. Moreover, one or more digital filters can be applied to adjust lighting parameters in one or more areas of the further image (or the reference image). In some embodiments, method 300 may further include the operations of automatic analyzing ambient lighting data of the reference image, selecting a light filter based on the analyzing of the ambient light data of the reference image, and applying the light filter to the at least one further image.

At operation 315, the mobile application (or the web service) automatically analyzes the reference image to determine positions for the at least one object for integrating into a combined image. The analysis can be also performed to determine optimal parameters for a substantial alignment of the at least one object in the background of the further image and the reference image, in case the further image and the reference image have the same or substantially similar or common background.

At operation 320, the mobile application (or the web service) automatically adjusts lighting parameters of the further image to match lighting parameters of the reference image. The lighting parameters can include a brightness and a light direction. Moreover, the lighting conditions can be determined with sensors built into mobile device 105. In addition, the modification of the lighting parameters of the further image can be performed automatically by obtaining and analyzing depth and perspective data of the reference image and the at least one further image, and by obtaining and analyzing light and shadow data of the reference image and the at least one further image.

At operation 325, the mobile application (or the web service) seamlessly merge the reference image and the further image into the combined image by placing the object of the further image into the reference image according to the determined positions. The combined image can be further modified by applying one or more digital filters. The filters can be applied manually by the user or automatically. Additionally, the combined image can be cropped, scaled, rotated, transformed, and so forth.

According to some embodiments, method 300 may further include the operation of providing guidance to the user to assist with placement of the object into the reference image. The guidance may include visual, audio, or haptic prompts for the user. Additionally, method 300 may present the reference image or the further image to the user using one or more Augmented Reality (AR) overlays on a screen of mobile device 105. The AR overlays may also provide guidance to the user for placement the object of the further image into the reference image. For example, the object of the further image can be retrieved or isolated by the mobile application and presented to the user on a screen over a live camera view. This feature can help the user to properly position the object into the reference image. The object(s) can be automatically selected, isolated, and composited automatically using segmentation techniques described in Aksoy et al., *Semantic Soft Segmentation*, ACM Trans. Graph., Vol. 37, No. 4, Article 72 (August 2018), which is incorporated herein by reference for all purposed in its entirety. The GUI of mobile application can also include controls to transform the object, including, without limitations, zooming, rotating, scaling, repositioning, changing colors, changing lights, and so forth.

According to some additional embodiments, method 300 may further include the operation of automatically analyzing distance data of two or more of objects present in the reference image, selecting an AR user guide based on the analysis of the distance data, and presenting the selected AR user guide to a user. The user can also create or update a library with one or more of the following: the combined image, the reference image, and the at least one further image. The library can refer to a local library stored in mobile device 105, another mobile device, or web-based resource 130.

In an example embodiment, at least one further image may include a two-dimensional (2D) model or a three-dimensional (3D) model. The 2D model or the 3D model may represent a person, such as a celebrity, spokesperson, athlete, influencer, and so forth. In an example embodiment, instead of selecting an object (a person) from a further image to be merged with or placed into the reference image, the user may select the 2D or the 3D model from a variety of 2D and 3D models available in a database. The 2D and 3D models may include 2D and 3D images of people in a variety of positions and body types, as well as 2D or 3D models of animals or objects in various positions, and with customizable parameters, such as size, shape, color, texture, pattern, and so forth.

The 2D or the 3D model can be customized by the user. Specifically, method 300 may, optionally, include receiving, from a user, a selection of parameters of the 2D or the 3D model. The parameters may include a body type, face, skin tone, pose, apparel, and so forth. The 2D or the 3D model can be modified based on the parameters to obtain a modified 2D or 3D model. In this embodiment, the seamless merging of the reference image and the at least one further image may include placing the modified 2D or 3D model onto the reference image to obtain a combined image. For example, the user may select a body type for the 2D or 3D model, such as ectomorph (a slim body type), mesomorph (an average body type), or endomorph (a wide body type). Once the user has selected the body type, the user can upload an image of a face the user wants to place on the 2D or 3D model, or an avatar, i.e. the face is a face of the user or another individual. In an example embodiment, the user can upload a variety of faces for the avatar, so that the user has the ability to switch between the faces when creating the avatar for placing into the combined image. The user may also select a skin tone from a library of predetermined shades, or select to automatically match the skin tone of an uploaded image of the face. The user can also select a proper pose to match the parameters of the reference image. The poses can include standing, sitting, kneeling, laying down, inverted (handstand), and the like, the arms may be up, down, out, or at various angles with the elbows bent and not bent. In other words, any possible pose of the body can be available to the user for selection.

After the 2D or 3D model for the person is created, the user can save the avatar in the form of a 2D or 3D model for future use. If the user wants to change the body type or hair color, the user can edit the saved avatar. Upon selection of the parameters, the user can select an outfit, such as a set of clothes, for the 2D or 3D model by selecting an apparel, such as pants, shirts, jackets, shoes, belts, hats, glasses, jewelry, accessories, and so forth. In an example embodiment, the apparel may include generic items in standard colors. In a further embodiment, the apparel may include sponsored clothing and accessory brands. The available sponsored apparel options may correspond to the selected body type of the user. If an apparel retailer does not produce a certain style in a certain size, the apparel may not be available for the selected body type.

Once the 2D or 3D model has been modified based on the parameters selected by the user, the user can place the modified 2D model or the modified 3D model into the reference image to be merged into the combined image. The user may have both the light filters and the AR placement/reference guide. The algorithms of the AR placement/reference guide may be able to detect the lighting parameters in the reference image and apply the same lighting parameters to the 2D or 3D model. In an example embodiment, the user may see a partially transparent ('ghosted') 2D or 3D model placed over the reference image indicating where the user can drop the 2D or 3D model.

Once the user has placed the 2D or 3D model, the user can select the depth for placement of the 2D or 3D model in a foreground or background of the reference image. The user can confirm that all parameters are selected by pressing a button on a mobile device to automatically and seamlessly merge the 2D or 3D model into the reference image.

In a further example embodiment, the 2D or 3D model may represent items provided for sale by a retailer. For example, the 2D or 3D model may depict an apparel or an interior design item. When the user interacts with the 2D or 3D model, the user may provide a request to buy the item represented by the 2D or 3D model, for example, the user may click on the 2D or 3D model. Upon receiving the request from the user, the user may be directed to a store selling the item. If the store is an online store, a hyperlink may be provided to the user enabling the user to purchase the item directly from a retailer, a third party, or directly from the manufacturer. Thus, the user can be provided with the ability to purchase any of the items represented as 2D or 3D items associated with a digital avatar. Additionally, the user may be able to purchase the branded items that the user encounters while interacting with the AR environment.

In a further example embodiment, the user may engage with AR video content or add AR video content into the combined image. The AR video content or add AR video content may include a composite video or a composite animation. The AR video content may include footage of AR people, objects, and places. The user can drop the AR content into a video being recorded, and the added AR footage may look as if the AR footage is a natural part of the scene.

In an example embodiment relating to a retail environment, the user may be prompted, via the mobile device, to go to a certain area, such as a designated retail area, to find a particular brand-affiliated celebrity or spokesperson. When the user arrives at the location, the user may be checked in automatically (via a Global Positioning System (GPS), beacons, Bluetooth, and the like) or manually (via Facebook or Swarm, and the like) at the area.

Once checked in, the user may be able to make a 2D or 3D image of the brand-affiliated celebrity or spokesperson. Once the image is made, the user may be able to modify the 2D or 3D model by cycling through various poses of the celebrity or spokesperson to identify the optimal poses for the person. The appropriate AR guide and light filters may be further applied to the 2D or 3D model prior to merging the combined image.

In an example embodiment, the combined image may include a real individual and the 2D or 3D model of a celebrity. The combined image may also include an AR overlay highlighting the brand being promoted, for example, a movie, book, TV show, album, concert, sporting event, eatery, store, person, product, and so forth.

In a further example embodiment, the user may select the 2D or 3D model of the celebrity or spokesperson from the preloaded images at any location, for example, at home or a remote location, not a designated retail area.

The user may be notified of the opportunity to take the image with a 2D or 3D image of the brand-affiliated celebrity or spokesperson either through email or text or any other contact method. Additionally, instructions on how to download any associated mobile applications, if necessary, may be provided to the user. Likewise, the promotional notifications may be received by the mobile device of the user from social media, e.g., Facebook, Twitter, Instagram, and so forth.

The sponsored retailers, brands, and influencers may provide goods and services through the AR composite imagery, in which the user can drop a 2D model or 3D model of an item onto an image. Additionally, the user can drop the image onto a "virtual setting" of a digital location, e.g., in Paris in front of the Eiffel Tower, or in Disney World in front of Cinderella's Castle. In this embodiment, the user may create a digital avatar of the user or someone else by uploading an image of the face for a subject, selecting the appropriate skin tone to match (or the skin tone may be adjusted automatically), selecting an appropriate body type for the subject (endomorph, mesomorph, or ectomorph), and selecting from a catalogue of virtual 2D models or 3D models of sponsored items, e.g., clothes, with which to outfit the digital avatar.

In order to place branded items of third parties with the digital avatar of the user, the items may need to be rendered in a form of either a 2D model or a 3D model to match the avatar model type. For example, in a 2D model environment, the items may be placed with the avatar in the same "layering" style as a paper doll, while in the 3D model environment, the user can rotate the model to see all three dimensions, with the appropriate depth and perspective.

In an example embodiment, the third parties may incentivize user participation/consumer engagement via product discounts or rewards. The rewards may be redeemed online or in a brick-and-mortar store. In either case, the codes received by the users for the engagement with the system of the present disclosure may be uniquely coded so that when the codes are redeemed, the transaction is recorded to allow the third parties compensate administrators of the system for enabling the transaction.

Likewise, users may be able to purchase items throughout their engagement with the system, namely when the users are shown sponsored goods through AR images or during the avatar creation process. If the user wishes, the user can purchase any sponsored product through an application. Similarly, the purchase transactions can be tracked to compensate administrators of the system for enabling the transaction.

In an example embodiment relating to a gamified environment, the user may be prompted to go to a certain area to find a brand-affiliated celebrity or spokesperson in exchange for rewards and/or prizes. The user may be required to find multiple AR images of persons, such as celebrities, hidden throughout an area, such as a store, a shopping center, a town, and the like, or find AR images available online over a timed interval. Upon collecting a predetermined percentage, ratio, or number of the AR images by the user, the user may obtain the appropriate prorated reward. The predetermined percentage, ratio, or number may include X out of N, where X is the required number to be found and N is the total number of hidden AR persons from which the user needs to find the predetermined number.

For example, the user may collect 8 out of 10 AR images during a "photo treasure hunt" or "image capture scavenger hunt" scenario and may receive a discount in the amount of 40% off of a future purchase (5% off per collected image). If the user collects all 10 AR images, the user may receive a discount of 50% off, as well as unlock premium AR video content with which the user may engage. The AR video content may include footage of AR people, objects, and places recorded in such a way that the user can drop the AR content into a video the user is recording, and the added AR footage may look as if it is a natural part of the scene. Additionally, the user may collect 8 out of 10 required images, and then pay for the access to the other 2 (e.g., via an in-application purchase) to unlock the discount of 50% off, as well as the premium AR video content. In another embodiment, the AR video content may be accessible without unlocking access to the AR video content (for example, the AR video content may be available to the user as soon as the user opens the application).

The gamified retail model may include a "CLUE" element (similar to the board game CLUE), according to which the user may need to identify a location (the 'where') and then identify which item or product the user needs to locate at that location (the 'what') in order to find the hidden AR celebrity.

Upon finding the AR celebrity (the 'who'), the user may create the augmented combined image. For this engagement, i.e. for creating the combined image, the user may receive a discount at the retailer area or a code to be redeemed online or at another retail location.

In another example embodiment, the user may obtain clues online at a retailer website, through social media accounts of the retailer, and/or through email, text or other contact methods. The clues may provide the user with access to the desired AR person or object to be placed in the combined image or AR scene, into which the user can be placed. In addition, the gamified version of the retail embodiment may include a time-sensitive "flash sale" element according to which the user may be instructed to open a respective application at certain times to unlock a specific athlete, celebrity, and/or pose in order to capture the required image.

In addition, a reward checklist may be provided to increase the total reward for the user. For example, the user may receive 5% off for taking the augmented combined image, receive an additional 5% discount for posting the image to Facebook, receive an additional 5% discount for posting the image to Twitter, receive an additional 5% discount for posting the image to Instagram, receive an additional 5% discount for texting the image to another individual, receive an additional 5% discount for emailing the image to another individual, and the like. The maximum total reward may be limited by a threshold value, for example, a discount of 25% off.

Thus, brands, retail locations, marketers, agencies, manufacturers, social media influencers, and the like may use the systems and methods of the present disclosure to promote products and services. Third parties, such as retailers, brands, agencies, and influencers, can license the use of the system. Additionally, the retailers, brands, agencies, and influencers can sublicense the use of the system, e.g., a department store may sublicense the system of the present disclosure to individual brands the department store stocks. Additionally, the third parties that license or sublicense the system of the present disclosure may be advertised using the system.

Figure 4:
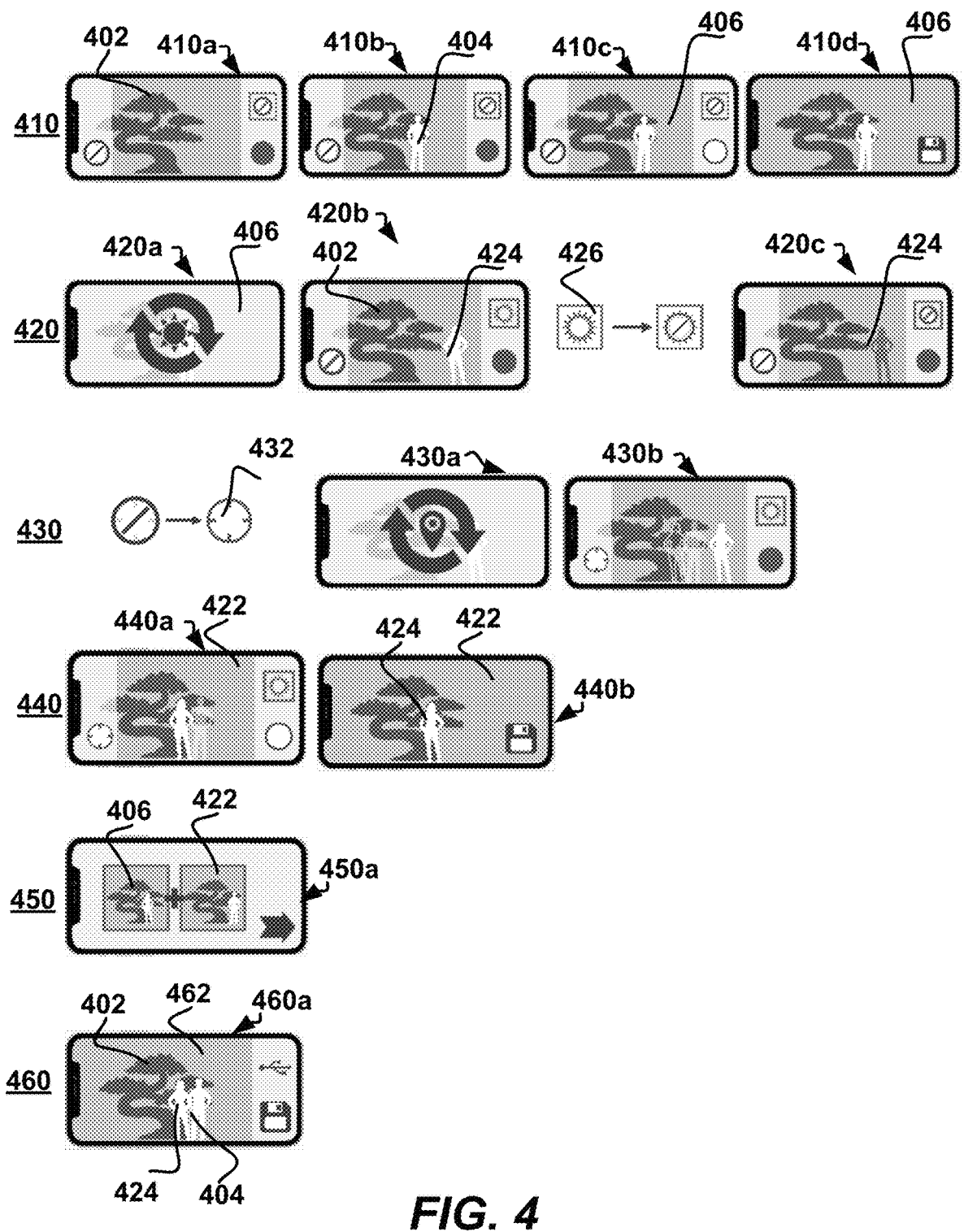
FIG. 4 is a flow chart of an example GUI sequence of steps for combining images, according to one example embodiment.

FIG. 4 is a flow chart of an example GUI sequence of steps for combining images, according to one example embodiment. The steps of FIG. 4 are displayable on a mobile device. Specifically, FIG. 4 illustrates a work flow of the method for combining images wherein a first image and a second image taken by a user are merged into a combined image.

At 410, the first image can be taken by the user with a camera of the mobile device. 410a shows a background 402 for the first image. 410b shows an object 404 for which the image is to be taken. 410c illustrates the first image 406 taken by the user. The first image 406 can include the background 402 and the object 404. The first image 406 may be stored in a database, as illustrated by 410d.

Step 420 includes automatic analysis of the ambient light of the first image 406, as illustrated by 420a. 420b shows a scene the user may see before taking a second image that may have the same background 402 and another object shown as an object 424. Based on the analysis of the ambient light of the first image 406, the mobile application (or the web service) identifies the best applicable light filter 426 for the second image from a set of available light filters. The best applicable light filter may be selected as shown by a 420c.

At step 430, the user can be guided by the mobile application to optimally place the object 424 in a combined image and assisted with the desired composition of the combined image. 430a illustrates a guide, such as an AR guide 432, to provide the user with guidance on merging the images. AR algorithms may be used to analyze the distance of the object 404 in the first image 406 as well as the overall perspective of the first image 406 and automatically apply the most applicable AR guide from an available plurality of AR guides for positioning the object 424 with respect to the object 404, as illustrated by 430b.

At step 440, the user may take the second image 422, then the selected light filter and AR guide can be applied to the second image 422, as shown by a GUI 440a. The second image 422 may be stored to the database or the web service, as illustrated by a GUI 440b.

GUI 440a can further allow the user to manually select an element or object depicted in the second image for merging with the first image. For example, the user can manually select the object 424 for merging. In other embodiments, however, the mobile application (or the web service) can automatically select object 424 for merging based on one or more predetermined criteria.

At step 450, a GUI element 450a shows automatic merging of the selected object 424 from the second image 422 into the first image 406 to seamlessly create a combined image 462. Step 460 may include storing the combined image 462 to the database, as shown by a GUI 460a. The combined image includes the same or substantially the same background 402, object 404 from the first image 406, and object 424 from the second image 422.

Figure 5:
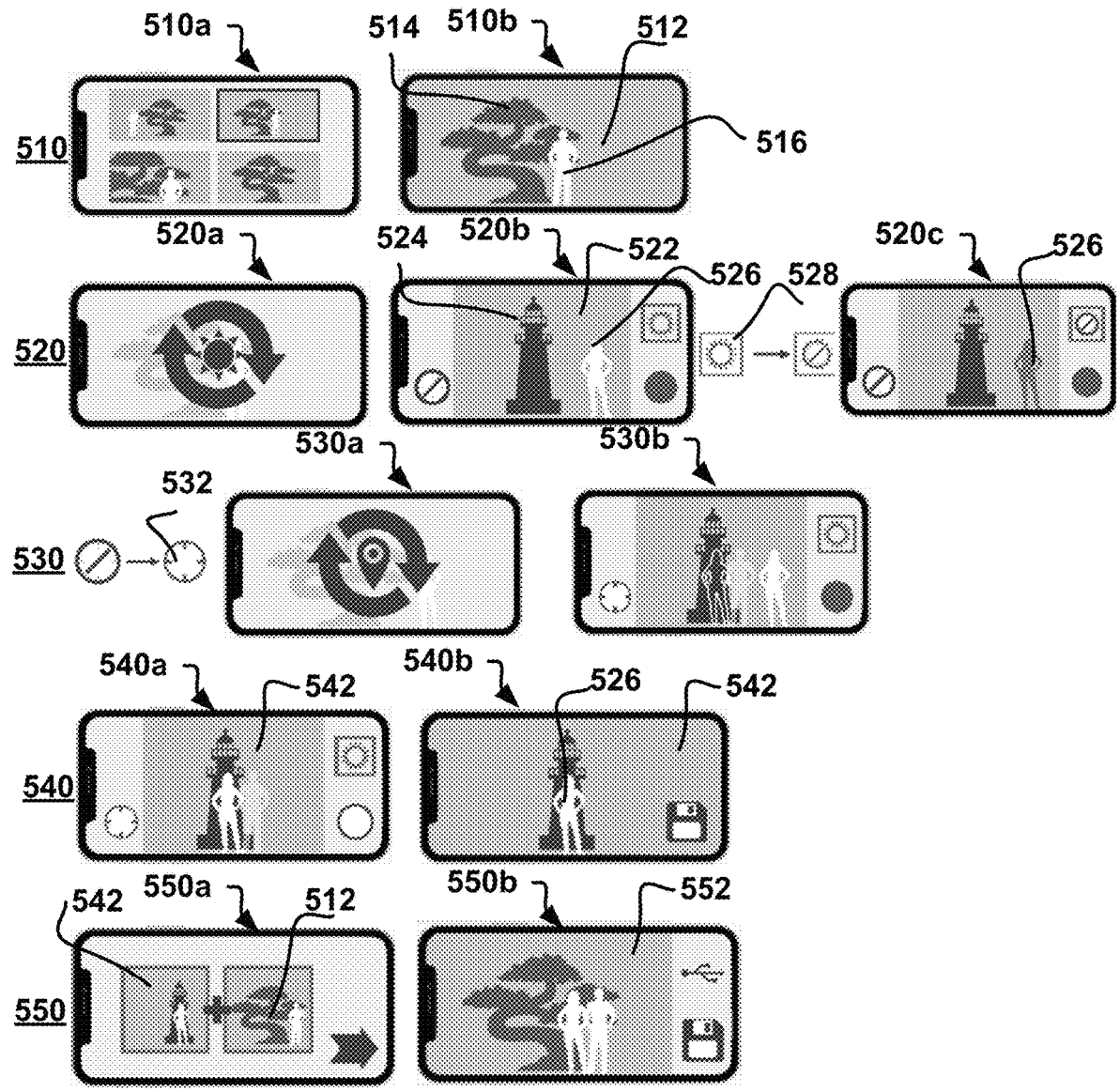
FIG. 5 is a flow chart of an example GUI sequence of steps for combining images, according to one example embodiment.

FIG. 5 is a flow chart of an example GUI sequence of steps for combining images, according to one example embodiment. Graphical elements of FIG. 5 are displayable by a mobile device of a user and can include a sequence of screens associated with the mobile application installed on a mobile device. Specifically, FIG. 5 illustrates a work flow of the method for combining images which can be used to allow a user to select an existing image, take an image, and merge the existing image and the image taken into a combined image.

Step 510 includes selecting an existing image by the user with a camera of the mobile device. 510a shows a set of available existing images. 510b illustrates the existing image 512 selected by the user. The existing image 512 can include the background 514 and an object 516.

Step 520 includes an automatic analysis of the ambient light of the existing image 512, as illustrated by a 520a. 520b shows a scene 522 the user may see before taking an image. The scene may have a background 524 and another object shown as an object 526. Based on the analysis of the ambient light of the existing image 512, the mobile application (or the web service) identifies the best applicable light filter 528 for the image from a set of available light filters. The best applicable light filter may be selected as shown by 520c.

At step 530, the user can be guided by the mobile application to assist the user with an optimal placement of the object 516 and object 526 in a combined image and assist with the desired composition of the combined image. A GUI element 530a of the mobile application represents the guide, such as an AR guide 532, to provide the user with guidance on merging the images. The AR algorithms may analyze the distance of the object 516 in the existing image 512, an overall perspective of the existing image 512, and automatically apply the most applicable AR guide from the available plurality of AR guides for positioning the object 516 with respect to the object 526, as illustrated by 530b.

At step 540, the user may take image 542 and the selected light filter and AR guide may be applied to image 542, as illustrated by a GUI element 540a. The image 542 may be stored to the database or the web service, as illustrated by 540b.

At step 550, after the user has selected the object 526 from the image 542 to merge with the existing image 512, the AR algorithms may automatically merge the selected object 526 of the image 542 with the existing image 512, as shown by 550a. The combined image 552 may be stored to the database, as illustrated by 550b.

Figure 6:
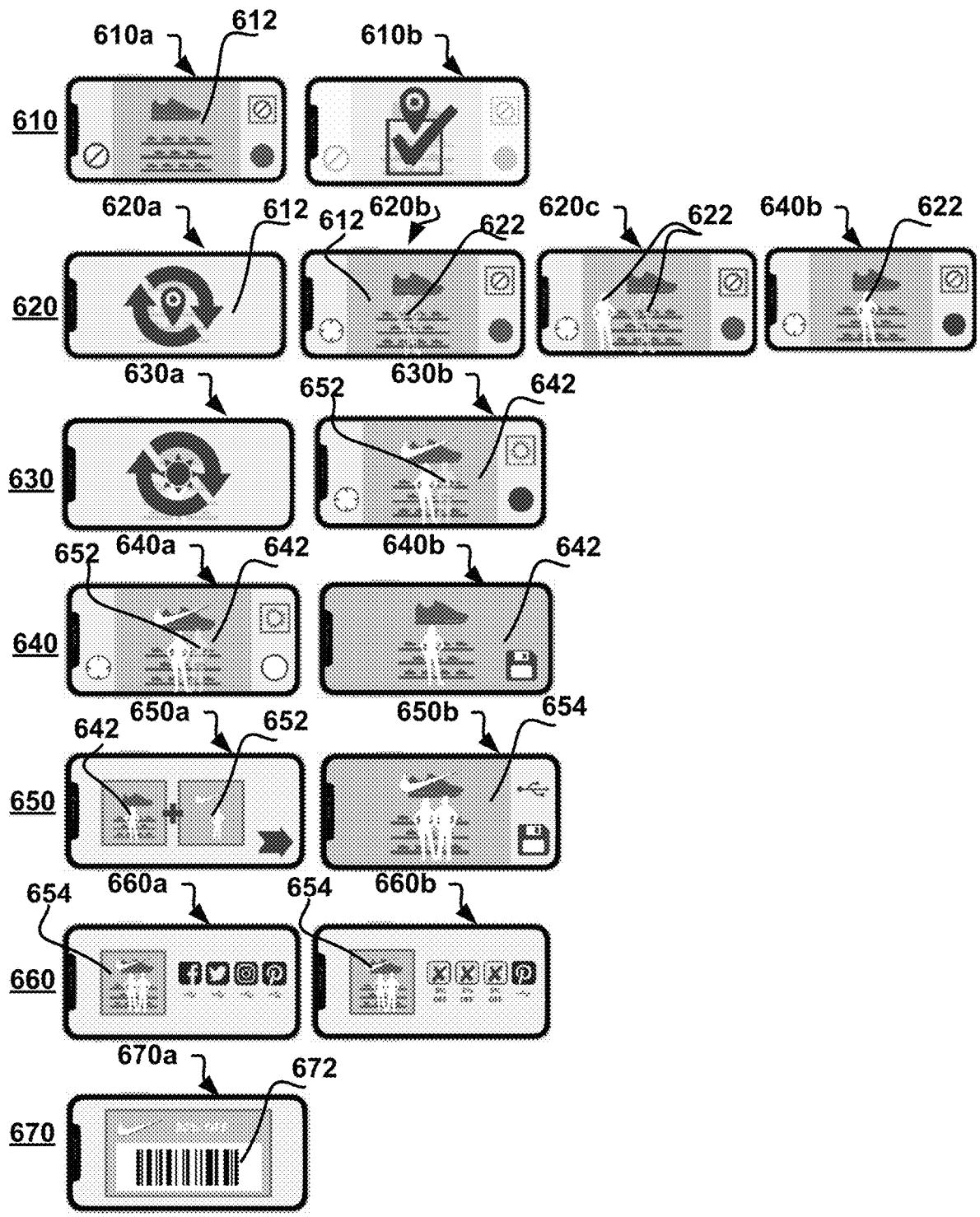
FIG. 6 is a flow chart of an example GUI sequence of steps for combining images, according to one example embodiment.

FIG. 6 is a flow chart of an example GUI sequence of steps for combining images, according to one example embodiment. Graphical elements of FIG. 6 are displayable by a mobile device of a user and can include a representation of screens associated with the mobile application installed on a mobile device. Specifically, FIG. 6 illustrates a work flow of the method for combining images when a user arrives at a retail location, finds a designated area for locating an AR image, takes an image at the location using AR guides and light filters, and merges the image with AR images into a combined image.

At step 610, the user arrives at a retail location and observes a scene 612 of the retail location via a camera and screen of the mobile device, as shown by 610a. The user may "check in" as illustrated by 610b to notify the system that the user is at the retail location.

At step 620, the AR algorithms may automatically analyze a distance to the surface and the overall perspective of the scene 612 and to identify and apply the most applicable AR guide selected from an available set of AR guides for positioning object 622 in an image, as illustrated by 620a. The user can be guided by the mobile application to assist the user with an optimal placement of an object 622 in the scene 612 and assist the user with the desired composition of the combined image, as shown by 620b, 620c, 620d. The object 622 may be taken from any preexisting image or with an image taken at the retail location. If the object 622 is not properly aligned, the AR guide may indicate an optimal position. Once the optimal position for the object 622 is found, the AR guide may issue an alert that the AR guide is ready to take an image.

Step 630 includes automatic analysis of the ambient light of the scene 612, as illustrated by 630a. Based on the analysis of the ambient light of the scene 612, the mobile application (or the web service) identifies the best applicable light filter for the image from a set of available light filters. The best applicable light filter may be selected as shown by 630b.

At step 640, the user may take the image 642 and the selected light filter and AR guide may be applied to the image 642, as shown by 640a. The image 642 may be stored to the database or the web service, as illustrated by 640b.

At step 640, the user may further select a 2D/3D model 652 to merge with the image 642. After the user has selected the 2D/3D model 652 to merge with the image 642, the AR algorithms may automatically merge the selected 2D/3D model 652 of with the image 642 at step 650, as shown by a 650a. The combined image 654 may be stored to the database, as illustrate by 650b.

At step 660, the user may share the combined image 654 in one or more social networks as illustrated by 660a. For each share, the user may be rewarded by a retailer, as shown by a 660b. At step 670, the reward 672 may be redeemed to product purchase in-store at the retail location or online, as shown by a 670a.

Figure 7:
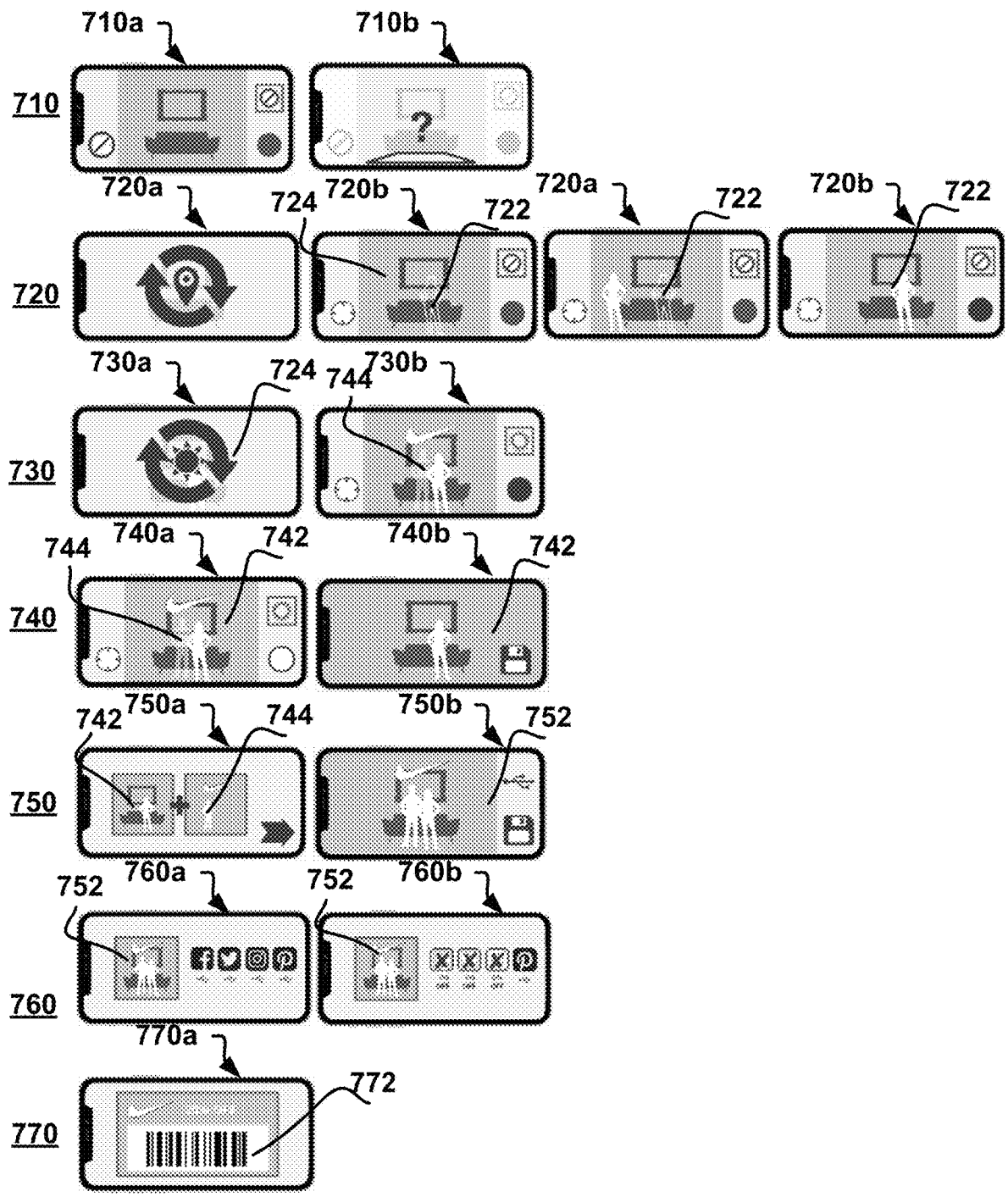
FIG. 7 is a flow chart of an example GUI sequence of steps for combining images, according to one example embodiment.

FIG. 7 is a flow chart of an example GUI sequence of steps for combining images, according to one example embodiment. GUI elements of FIG. 7 are displayable by a mobile device of a user and can include a representation of screens associated with the mobile application installed on a mobile device. Specifically, FIG. 7 illustrates a work flow of the method for combining images when a user receives an alert that a new image is available, takes an image in a corresponding location using AR placement guides and light filters, and merges the image with an AR image into a combined image.

At step 710, the user may receive an alert that a new image is available, as shown by 710a. Alternatively, no alert may be sent, and the user may be required to take a guess as to when the new image becomes available, as shown by 710b. The user may open a mobile application on a mobile device to find a flat surface.

At step 720, the flat surface of a scene 724 is located in front of the mobile device, and the AR algorithms may automatically analyze a distance to the surface and the overall perspective of the scene and identify and apply the most applicable AR guide as selected from an available set of AR guides for positioning of an object 722 on an image, as illustrated by 720a, 720b, 720c, and 720d. The object 722 may be taken from any preexisting image or an image with the object 722 may be taken. If the object 722 is not properly aligned, the AR guide may indicate an optimal position. Once the optimal location for the object 722 is found, the AR guide may issue an alert that the AR guide is ready to take an image.

Step 730 includes automatic analysis of the ambient light of the scene 724, as illustrated by 730a. Based on the analysis of the ambient light of the scene 724, the mobile application (or the web service) identifies the best applicable light filter for the image selected from a set of available light filters. The best applicable light filter may be selected, as shown by 730b.

At step 740, the user may take image 742 and the selected light filter and AR guide may be applied to image 742, as illustrated by 740a. The image 742 may be stored in the database, as illustrated by 740b.

At step 740, the user may further select a 2D/3D model 744 to merge with the image 742. After the user has selected the 2D/3D model 744 to merge with the image 742, the AR algorithms may automatically merge the selected 2D/3D model 744 with the image 742 at step 750, as shown by 750a. The combined image 752 may be stored to the database, as illustrated by 750b.

At step 760, the user may share the combined image 752 in one or more social networks as illustrated by 760a. For each share, the user may be rewarded by a retailer, as illustrated by 760b.

At step 770, the reward 772 may be redeemed to product purchase in-store at the retail location or online, as shown by a GUI 770a.

Figure 8:
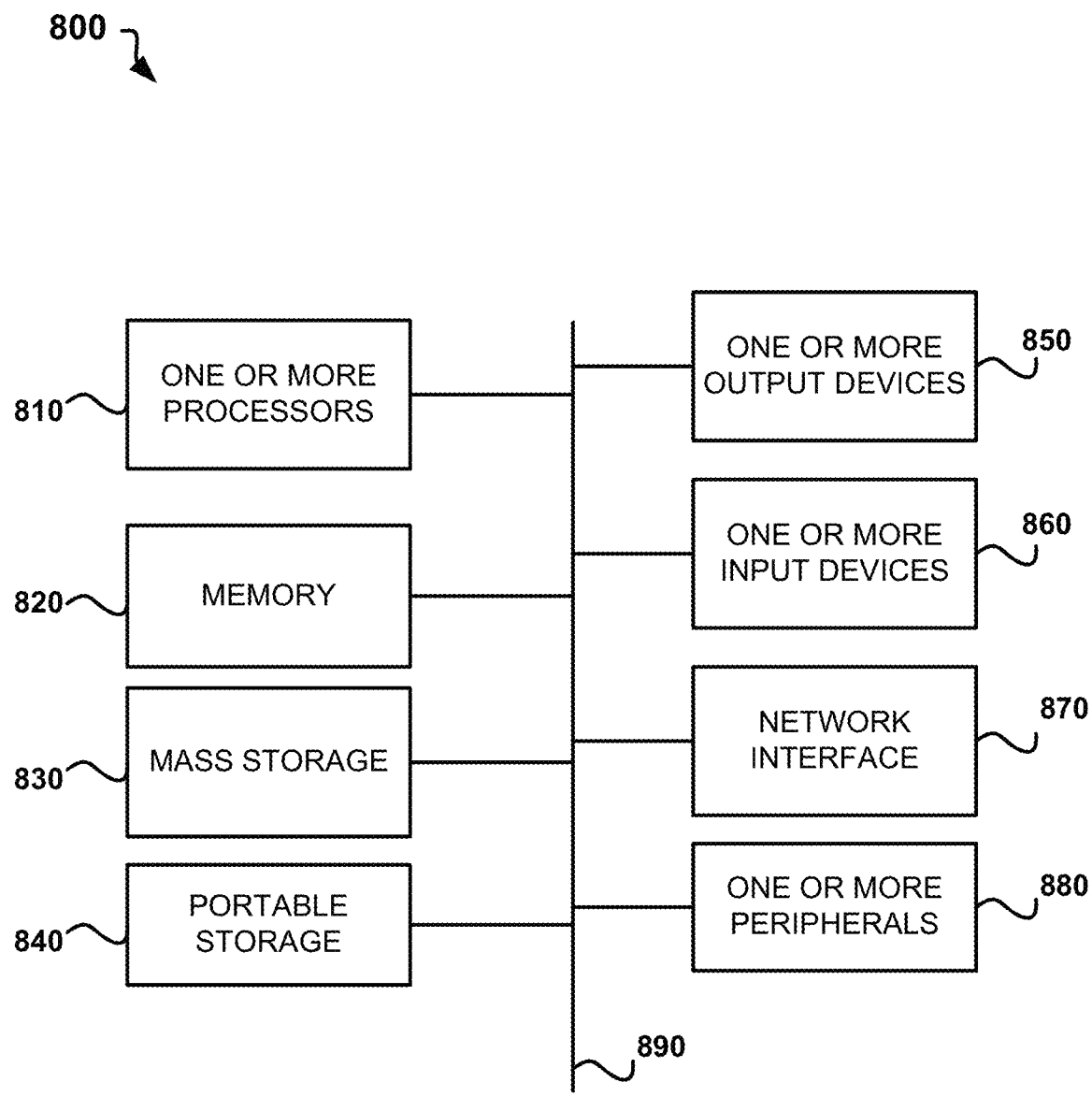
FIG. 8 is a computer system that may be used to implement the method for combining images according to an example embodiment.

FIG. 8 is a block diagram illustrating an example computer system 800 suitable for implementing the method for combining images as described herein. In particular, computer system 800 may include mobile device 105, web-based resource 130, or any parts thereof. FIG. 8 illustrates just one example of computer system 800 and in some embodiments computer system 800 may have fewer elements than shown in FIG. 8 or more elements than shown in FIG. 8.

Computer system 800 includes one or more processors 810, a memory 820, one or more storage devices 830, a portable storage 840, one or more input devices 850, one or more output devices 860, network interface 870, and one or more peripherals 880. These elements can be operatively interconnected via a communication bus 890. Processors 810 are, in some examples, configured to implement functionality and/or process instructions for execution within computer system 800. For example, processors 810 may process instructions stored in memory 820 or instructions stored on storage devices 830. Such instructions may include components of an operating system or software applications.

Memory 820, according to one example, is configured to store information within computer system 800 during operation. Memory 820, in some example embodiments, may refer to a non-transitory computer-readable storage medium or a computer-readable storage device. In some examples, memory 820 is a temporary memory, meaning that a primary purpose of memory 820 may not be long-term storage. Memory 820 may also refer to a volatile memory, meaning that memory 820 does not maintain stored contents when memory 820 is not receiving power. Examples of volatile memories include RAM, dynamic random-access memories (DRAM), static random-access memories (SRAM), and other forms of volatile memories known in the art. In some examples, memory 820 is used to store program instructions for execution by processors 810. Memory 820, in one example, is used by software. Generally, software refers to software applications suitable for implementing at least some operations of the methods for combining images as described herein.

Storage devices 830 can also include one or more transitory or non-transitory computer-readable storage media and/or computer-readable storage devices. In some embodiments, storage devices 830 may be configured to store greater amounts of information than memory 820. Storage devices 330 may further be configured for long-term storage of information. In some examples, the storage devices 830 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 8, computer system 800 may also include one or more input devices 850. Input devices 850 may be configured to receive input from a user through tactile, audio, video, or biometric channels. Examples of input devices 850 may include a keyboard, keypad, mouse, trackball, touchscreen, touchpad, microphone, one or more video cameras, image sensors, fingerprint sensors, or any other device capable of detecting an input from a user or other source, and relaying the input to computer system 800 or components thereof. As such, input devices 850 can be used by users or operators of system 105 to input commands, instructions, data, settings, and the like.

Output devices 860, in some examples, may be configured to provide output to a user through visual or auditory channels. Output devices 860 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 860 may also include a touchscreen, presence-sensitive display, or other input/output capable displays known in the art.

Computer system 800, in some example embodiments, also includes network interface 870. Network interface 870 can be utilized to communicate with external devices via one or more networks such as one or more wired, wireless, or optical networks including, for example, the Internet, intranet, local area network, wide area network, cellular phone networks, Bluetooth radio, and an IEEE 802.11-based radio frequency network, among others. Network interface 870 may be a network interface card, such as an Ethernet card, an optical transceiver, a radio frequency transceiver, or any other type of device that can send and receive information.

Operating system of computer system 800 may control one or more functionalities of computer system 800 or components thereof. For example, the operating system of computer system 800 may interact with software applications of computer system 800 and may facilitate one or more interactions between the software applications and one or more of processors 810, memory 820, storage devices 830, input devices 850, and output devices 860. The operating system of computer system 800 may interact with the software applications and components thereof. In some embodiments, the software applications may be included in the operating system of computer system 800. In these and other examples, virtual modules, firmware, or software of the software applications. In other examples, virtual modules, firmware, or software may be implemented externally to computer system 800, such as at a network location. In some such instances, computer system 800 may use network interface 870 to access and implement functionalities provided by virtual modules, firmware, or software for vehicle identification through methods commonly known as "cloud computing."

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of combining images, the method comprising:
    obtaining a reference image including a first background and at least one first object;
    obtaining a view intended for capturing in at least one further image, the view including a second background and at least one second object;
    automatically analyzing the reference image to determine positions for the at least one second object from the view for combining into a combined image;
    presenting, on one or more Augmented Reality (AR) overlays on a screen, an AR guide to guide a user on merging the reference image and the at least one further image, the AR guide depicting, on the second background, a representation of the at least one first object and the at least one second object in the positions with respect to the at least one first object;
    obtaining the at least one further image, the at least one further image being captured by the user upon selecting, by the user, the at least one second object in one of the positions depicted by the AR guide;
    automatically adjusting lighting parameters of the at least one further image to match lighting parameters of the reference image;
    placing the at least one second object on the at least one further image according to the one of the positions and storing the at least one further image with the at least one second object placed in the one of the positions; and
    seamlessly merging the reference image and the at least one further image into the combined image by placing the at least one second object into the reference image according to the one of the positions.

2. The method of claim 1, wherein the obtaining of the reference image includes generating the reference image in real time or selecting the reference image from a library.

3. The method of claim 1, wherein the obtaining of the at least one further image includes generating the at least one further image in real time.

4. The method of claim 1, wherein the at least one second object includes an individual.

5. The method of claim 1, further comprising selecting the at least one second object from the at least one further image.

6. The method of claim 5, wherein the selecting is performed automatically or based on an input of the user.

7. The method of claim 1, wherein the at least one further image includes one of the following: a two-dimensional (2D) model, a three-dimensional (3D) model, an Augmented Reality (AR) image, and an AR video content.

8. The method of claim 7, further comprising:
    receiving, from the user, a selection of parameters of the 2D model or the 3D model, the parameters including one or more of the following: a body type, a face, a skin tone, a pose, and an apparel; and
    modifying the 2D model or the 3D model based on the parameters to obtain a modified 2D model or a modified 3D model, wherein the seamless merging of the reference image and the at least one further image includes placing the modified 2D model or the modified 3D model onto the reference image to obtain the combined image.

9. The method of claim 7, wherein the 2D model or the 3D model is associated with at least one item, the method further comprising:
    receiving, from the user, a request to buy the at least one item associated with the 2D model or the 3D model;
    based on the request, directing the user to a store selling the at least one item.

10. The method of claim 1, further comprising providing guidance to the user to assist the user with the placing of the at least one second object into the reference image.

11. The method of claim 1, further comprising presenting the reference image or the at least one further image to the user using one or more AR overlays on a screen.

12. The method of claim 1, further comprising automatically analyzing distance data of two or more objects present in the reference image, selecting an AR user guide based on the analysis of the distance data, and presenting the selected AR user guide to the user.

13. The method of claim 1, further comprising modifying the at least one further image based on an input of the user, wherein the modifying of the at least one further image includes scaling, rotating, cropping, or repositioning of the at least one further image.

14. The method of claim 1, further comprising creating or updating a library with one or more of the following: the combined image, the reference image, and the at least one further image.

15. The method of claim 1, further comprising applying one or more digital filters to the at least object second in the combined image.

16. The method of claim 15, wherein the applying of the one or more digital filters is to adjust highlights in one or more areas of the at least one further image.

17. The method of claim 1, wherein the automatically modifying lighting parameters of the at least one further image is performed automatically by obtaining and analyzing depth and perspective data of the reference image and the at least one further image, and by obtaining and analyzing light and shadow data of the reference image and the at least one further image.

18. The method of claim 1, further comprising automatically analyzing ambient light data of the reference image, selecting a light filter based on the analyzing of the ambient light data of the reference image, and applying the light filter to the at least one further image.

19. A system of combining images, the system comprising at least one processor and a memory storing processor-executable codes, wherein the at least one processor is configured to implement the following operations upon executing the processor-executable codes:
   obtain a reference image including a first background and at least one first object;
   obtain a view intended for capturing in at least one further image, the view including a second background and at least one second object;
   automatically analyze the reference image to determine positions for the at least one second object from the view for combining into a combined image;
   present, on one or more Augmented Reality (AR) overlays on a screen, an AR guide to guide a user on merging the reference image and the at least one further image, the AR guide depicting, on the second background, a representation of the at least one first object and the at least one second object in the positions with respect to the at least one first object;
   obtain the at least one further image, the at least one further image being captured by the user upon selecting, by the user, the at least one second object in one of the positions depicted by the AR guide;
   automatically adjust lighting parameters of the at least one further image to match lighting parameters of the reference image;
   place the at least one second object on the at least one further image according to the one of the positions and storing the at least one further image with the at least one second object placed in the one of the positions; and
   seamlessly merge the reference image and the at least one further image into the combined image by placing the at least one second object into the reference image according to the one of the positions.

20. A non-transitory processor-readable medium having instructions stored thereon, which when executed by one or more computers, cause the one or more computers to implement a method of combining images, the method comprising:
   obtaining a reference image including a first background and at least one first object;
   obtaining a view intended for capturing in at least one further image, the view including a second background and at least one second object;
   automatically analyzing the reference image to determine positions for the at least one second object from the view for combining into a combined image;
   presenting, on one or more Augmented Reality (AR) overlays on a screen, an AR guide to guide a user on merging the reference image and the at least one further image, the AR guide depicting, on the second background, a representation of the at least one first object and the at least one second object in the positions with respect to the at least one first object;
   obtaining the at least one further image, the at least one further image being captured by the user upon selecting, by the user, the at least one second object in one of the positions depicted by the AR guide;
   automatically adjusting lighting parameters of the at least one further image to match lighting parameters of the reference image;
   placing the at least one second object on the at least one further image according to the one of the positions and storing the at least one further image with the at least one second object placed in the one of the positions; and
   seamlessly merging the reference image and the at least one further image into the combined image by placing the at least one second object into the reference image according to the one of the positions.

* * * * *